Jan. 24, 1950     O. G. WENGERT     2,495,358
WAGON BOX UNLOADING SCRAPER
Filed March 31, 1948     2 Sheets-Sheet 1
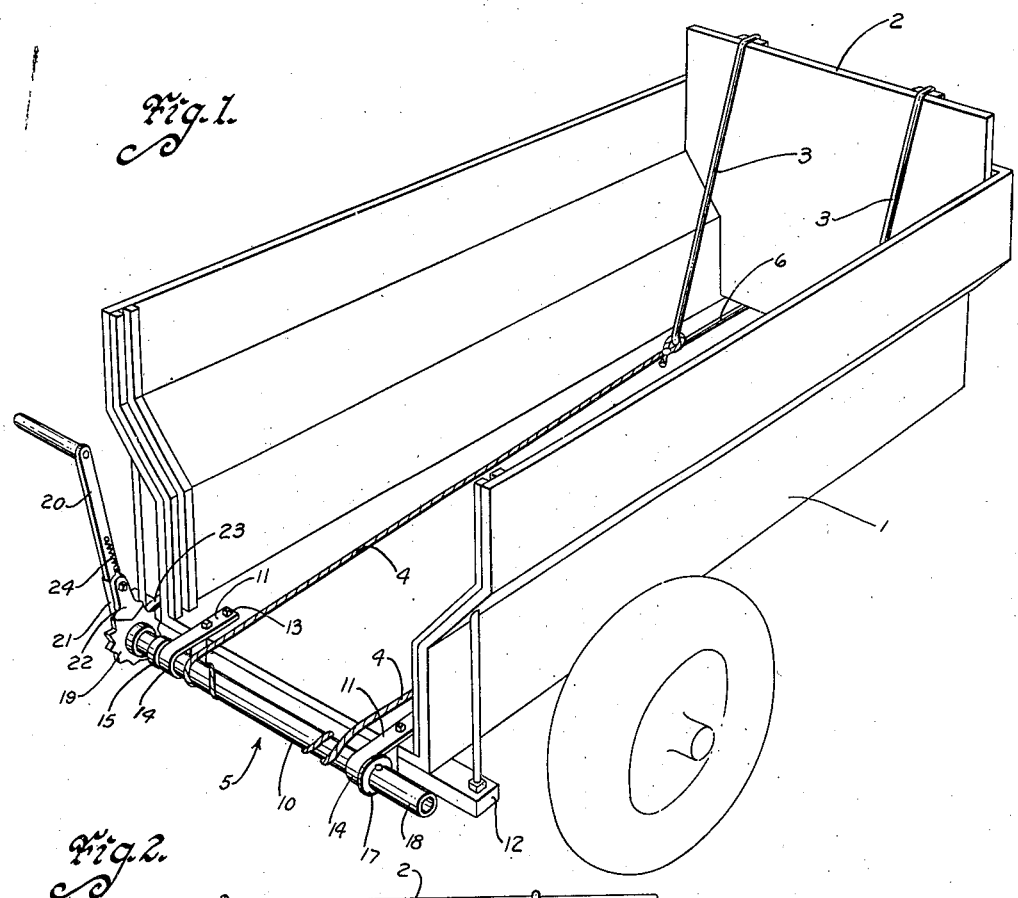
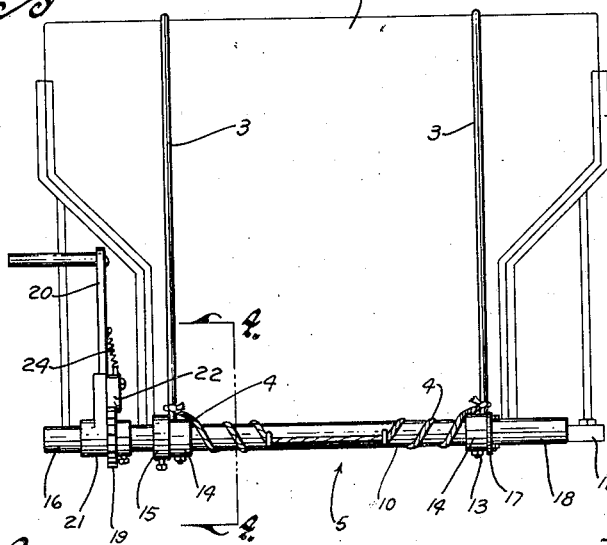
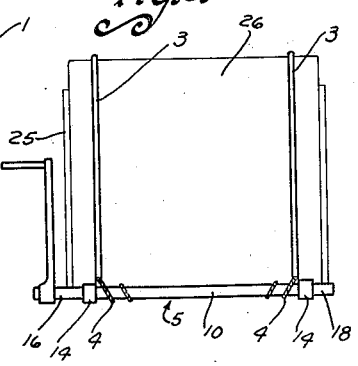
Inventor
Orville G. Wengert
by Harry L. Yinzer
Attorney
Witness
Edward P. Seeley

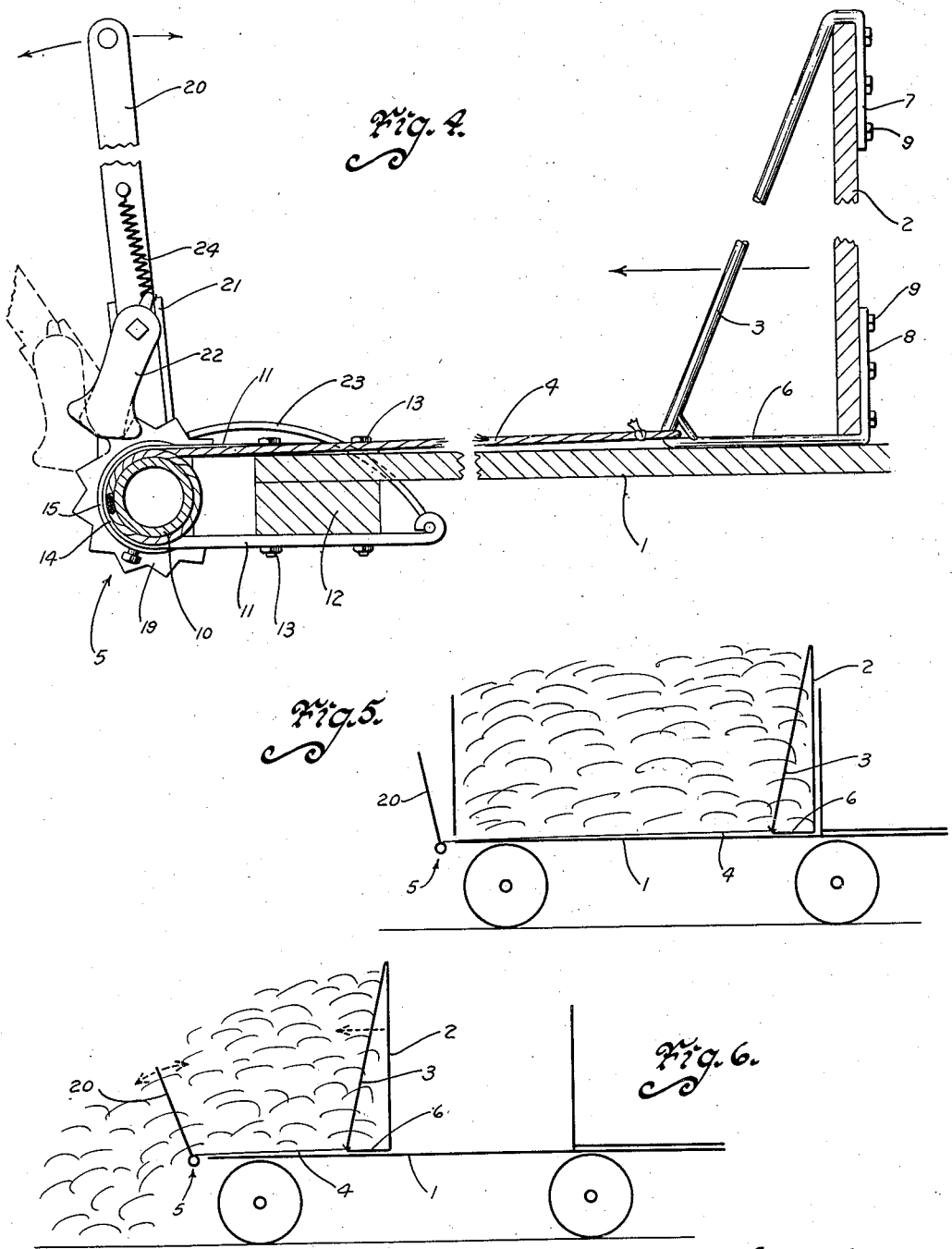

Patented Jan. 24, 1950

2,495,358

UNITED STATES PATENT OFFICE 2,495,358

WAGON BOX UNLOADING SCRAPER

Orville G. Wengert, State Center, Iowa

Application March 31, 1948, Serial No. 18,232

1 Claim. (Cl. 214—82)

This invention relates to a means of unloading a wagon box of its contents and more particularly to a scraper means to be pulled from the front to the rear of a wagon box pushing the contents out the rear of the wagon box as the scraper moves rearwardly.

It is an object of the invention, among others, to provide a scraper to be mounted in a wagon box with a new and improved means on the rear of the wagon box connected with the scraper to allow one man to move the scraper and wagon contents rearwardly.

It is a further object of the invention to provide means at the rear of the wagon box connected with the scraper that may be actuated from either the right or left hand side of the wagon.

It is a still further object of the invention to provide a wagon box scraper and actuation means therefor that is simple in construction and operation, easy to operate and economical both in construction and operation; a wagon box scraper and actuation means therefor that is long lasting and durable in operation, requiring less repair and lost time in operation; a wagon box scraper and actuation means therefor that is easy to operate, simple in design and easy of repair in case of breakdown; a wagon box scraper and actuation means therefor requiring no special skill on the part of an operator to mount on a wagon box; and a wagon box scraper and actuation means therefore that can be supplied and operated at a much lower cost than anything on the market at present.

With the foregoing and other objects in view, the invention will be more fully described herewith and will be particularly pointed out in the claim appended hereto.

In the drawings, wherein like symbols refer to like or corresponding parts throughout the several views:

Figure 1 is an elevational view showing a wagon box, scraper and actuation means to move the scraper from the front to the rear of the wagon.

Figure 2 is a rear elevational view showing the wagon box, scraper and actuation means to move the scraper from the front to the rear of the wagon from the rear.

Figure 3 is a diagrammatic view showing the scraper and actuation means on a wagon box that is rectangular in shape instead of the shape shown in Figures 1 and 2.

Figure 4 is a sectional view taken on the line 4—4 of Figure 2.

Figure 5 is a diagrammatic view of a wagon with a loaded wagon box thereon and the scraper at the front of the wagon box.

Figure 6 is a diagrammatic view of the wagon of Figure 5 with the scraper pulled half-way to the rear in the wagon box and the contents of the wagon box being discharged from the rear of the wagon box.

A wagon box 1 is shown in Figure 1, made wider at the top than at the bottom with a scraper 2 mounted in the front of the wagon box 1. The scraper 2 may be made of any suitable material; wood having been found to be a suitable material. The scraper 2 is mounted on brace members 3 at approximately each end of the scraper 2 and ropes 4 are attached to each brace 3 and an actuation means 5 mounted on the rear of the wagon box 5 to pull the scraper 2 from the front to the rear of the wagon box 1. The scraper 2 is made of a size to completely fill the wagon box 1 and as the scraper 2 moves rearwardly, it will push ahead of it the contents of the wagon box 1 and discharge them, over the rear end of the wagon box 1.

The braces 3 are triangular in shape and a portion 6 forms a base upon which the braces 3 are supported and forms a skid means on which the scraper 2 moves. The braces 3 have portions 7 and 8 that go around the rear of the scraper 2 and bolts 9 pass through the portions 7 and 8 into the scraper 2 to attach the braces 3 to the scraper 2.

The actuation means 5 on the rear of the wagon box 1 is made up of a rotary shaft 10 upon which the ropes 4 are anchored and upon which the ropes 4 are adapted to wind or unwind as the shaft 10 is rotated. Strap metal portions 11 are bent, as shown clearly in Figure 4 to form bearings for the shaft 10. The top of the strap 11 seats on the wagon box bottom and the bottom of strap 11 goes under the wagon box bottom. Two holes are drilled in the wagon box bottom through reenforcing member 12 and two bolts 13 are put through the straps 11 and reenforcing member 12 to attach the straps 11 to the back of the wagon box 1. In assembly with both straps 11 mounted on the rear of the wagon box 1, the shaft 10 is entered through the bearing portions 14 formed by banding the straps 11. A clamping member 15 is clamped on the outside of shaft 10 when the shaft 10 is properly journaled in the bearings 14 leaving a portion 16 of the shaft 10 extending beyond the clamping member 15. At the other bearing point 14, a second clamping member 17 is attached to the shaft 10 to clamp the shaft 10 between the bearings 14 without any longitudinal movement of shaft 10 possible. A portion 18 of the shaft 10 extends beyond the bearing 14 on this side of shaft 10.

A ratchet wheel 19 is mounted on either of the portions 16 or 18 or the shaft 10 and attached to the shaft 10 so as to rotate with the shaft 10. A handle 20 is mounted on the shaft 10 adjacent the ratchet wheel 19 and has a hub portion 21 to fit on shaft 10 adjacent the ratchet wheel 19 with the handle 20 movably with relation to shaft 10. A dog 22 is pivotally mounted on the handle 20 and is adapted to mesh with the gears on the gear wheel 19. When the handle 20 is pulled to the left, the dog 22 meshes with the gears in gear wheel 19 to move gear wheel 19 and shaft 10 to the left thus winding the wires 4 on the shaft 10 and pulling the scraper 2 rearwardly in the wagon box 1. A detent 23 has one end thereof attached to the strap 11 and the other end thereof contacting the gear wheel 19. The detent 23 functions to prevent the ratchet wheel 19 from turning to the right while allowing movement to the left. A spring 24 has one end attached to the handle 20 and the other end attached to the dog 22 to exert a pressure against dog 22 when dog 22 has moved to the left as far as desired to return the dog 22 to its vertical position.

In operation, the scraper 2 is moved as far to the front of the wagon box 1 as possible, and the wagon box 1 is loaded as represented diagrammatically in Figure 5. The scraper 2 may be made to fit the wagon box 2 of Figure 1 or may be made to fit a square or rectangular wagon box 25 as the scraper 26 represented in Figure 3. When it is desired to unload the wagon box, a lone operator may set the actuation means 5 into operation by moving handle 20 as far to the left as possible, thus rotating ratchet wheel 19 and shaft 10 to wind ropes 4 on shaft 10 to pull scraper 2 rearwardly. The handle 20 is moved to the right with dog 22 meshing in another gear on ratchet wheel 19 with the ratchet wheel 19 and shaft 10 moved to the left again. This operation is repeated with the scraper 2 moving rearwardly as illustrated in Figure 6 with the contents of the wagon box being discharged from the rear of the wagon box. The ratchet wheel 19 and handle 20 may be mounted on either the portion 16 or 18 depending upon convenience.

It will be understood that the invention has been described for purposes of illustration and explanation and that changes and variations are possible without departing from the scope of the invention. All such modifications and changes are intended to be included in the appended claim.

I claim:

In combination with a wagon box, a vertical scraper wall slidably engaging the bottom of said wagon, two spaced apart brace rod runners on said scraper wall; said brace rod runners each extending downwardly and rearwardly from the top of the scraper wall to points adjacent the bottom of said wagon box and thence horizontally forward to the bottom of said scraper wall; a rotary mounted shaft on the rear end of said wagon box, a means to facilitate the manual rotation of said shaft, and two flexible cable members having their forward ends secured to the rearmost ends of the two brace rod runners respectively, and their rear ends secured to said rotary mounted shaft; said two cable members having their length between said shaft and scraper wall adjacent the bottom of said wagon box.

ORVILLE G. WENGERT.

REFERENCES CITED

The following references are of record in the file of this patent:

UNITED STATES PATENTS

| Number | Name | Date |
|---|---|---|
| 766,866 | Bendickson | Aug. 9, 1904 |
| 2,138,893 | Wallace | Dec. 6, 1938 |
| 2,298,982 | Smith | Oct. 13, 1942 |
| 2,405,534 | Voth | Aug. 6, 1946 |
| 2,448,737 | Reisenweber | Sept. 7, 1948 |
| 2,463,643 | Recker | Mar. 8, 1949 |